United States Patent
Pang et al.

(10) Patent No.: US 10,389,968 B1
(45) Date of Patent: Aug. 20, 2019

(54) LASER PROJECTION DEVICE

(71) Applicant: Qingdao Hisense Laser Display Co., Ltd., Qingdao, Shandong (CN)

(72) Inventors: Xianglai Pang, Suwanee, GA (US); Changming Jia, Suwanee, GA (US); Hongjie Fan, Suwanee, GA (US); Fei Zhao, Suwanee, GA (US); Zinan Zhou, Suwanee, GA (US); Xiuyan Cao, Suwanee, GA (US)

(73) Assignee: Qindao Hisense Laser Display Co., Ltd., Qingdao, Shandong (CN)

( * ) Notice: Subject to any disclaimer, the term of this patent is extended or adjusted under 35 U.S.C. 154(b) by 0 days.

(21) Appl. No.: 16/029,272

(22) Filed: Jul. 6, 2018

(30) Foreign Application Priority Data

Mar. 16, 2018  (CN) .......................... 2018 1 0219402
Mar. 16, 2018  (CN) .......................... 2018 1 0224183
(Continued)

(51) Int. Cl.
*H04N 5/74* (2006.01)
*G03B 21/20* (2006.01)
*G03B 21/28* (2006.01)

(52) U.S. Cl.
CPC ........... *H04N 5/74* (2013.01); *G03B 21/2033* (2013.01); *G03B 21/28* (2013.01)

(58) Field of Classification Search
CPC ...... G03B 21/16; G03B 21/28; G03B 21/145; G03B 21/2033; H04N 5/74; H04N 5/2251;
(Continued)

(56) References Cited

U.S. PATENT DOCUMENTS 6,659,659 B1  12/2003  Malone
2006/0077354 A1*  4/2006  Goik ..................... G03B 21/16
353/57
(Continued)

FOREIGN PATENT DOCUMENTS

CN  103062682 A  4/2013
CN  103574317 A  2/2014
(Continued)

OTHER PUBLICATIONS

International Search Report issued Dec. 28, 2018 for PCT Application No. PCT/CN2018/091141, Chinese language only (9 pp.).
(Continued)

*Primary Examiner* — Sultan Chowdhury
(74) *Attorney, Agent, or Firm* — Brinks Gilson & Lione

(57) ABSTRACT

A laser projection device may include a laser, an installing bracket and a sealing ring. A sidewall of the laser may include an annular groove. A laser installing opening may be included on the installing bracket and the laser may be fitted in the laser installing opening. The sealing ring may include an embedded portion and a curved portion. A first bevel chamfer may be formed on an outer side of the curved portion, and a second bevel chamfer may be formed between the top surface and an inner wall of the laser installing opening. The sealing ring may be located between the sidewall of the laser and the laser installing opening, and the first bevel chamfer and the second bevel chamfer fit together.

20 Claims, 9 Drawing Sheets

(30) Foreign Application Priority Data

| | | |
|---|---|---|
| Mar. 16, 2018 | (CN) | 2018 1 0224184 |
| Jun. 19, 2018 | (CN) | 2018 1 0628604 |
| Jun. 19, 2018 | (CN) | 2018 1 0636208 |

(58) Field of Classification Search
CPC ...... H04N 5/2252; H04N 5/2256; F21K 9/90; F21K 9/272; F21K 9/275; F21S 4/22; F21S 4/24; F21V 15/012; F21V 15/015
See application file for complete search history.

(56) References Cited

U.S. PATENT DOCUMENTS

| | | | |
|---|---|---|---|
| 2008/0225913 A1* | 9/2008 | Stohr | H01S 5/02236 372/36 |
| 2015/0036107 A1 | 2/2015 | Nagahara et al. | |
| 2017/0159893 A1 | 6/2017 | Wang et al. | |

FOREIGN PATENT DOCUMENTS

| | | |
|---|---|---|
| CN | 203490412 U | 3/2014 |
| CN | 204459257 U | 7/2015 |
| CN | 105179984 A | 12/2015 |
| CN | 105319808 A | 2/2016 |
| CN | 105404085 A | 3/2016 |
| CN | 105573034 A | 5/2016 |
| CN | 205385193 U | 7/2016 |
| CN | 205811265 U | 12/2016 |
| CN | 206449489 U | 8/2017 |
| EP | 2 980 872 A1 | 3/2016 |
| JP | 2009-223121 A | 10/2009 |

OTHER PUBLICATIONS

Chinese Search Report for corresponding Application No. PCT/CN2018/094899.

* cited by examiner

US 10,389,968 B1

LASER PROJECTION DEVICE

CROSS-REFERENCE TO RELATED APPLICATION

This application claims priority to Chinese Patent Applications No. 201810224183.3, filed on Mar. 16, 2018, titled "PACKAGE STRUCTURE OF MCL LASER AND LIGHT SOURCE MODULE", No. 201810224184.8, filed on Mar. 16, 2018, titled "PACKAGE ASSEMBLY OF LASER, LIGHT SOURCE MODULE AND LASER PROJECTOR", No. 201810219402.9, filed on Mar. 16, 2018, titled "PACKAGE ASSEMBLY, LASER ASSEMBLY, LASER LIGHT SOURCE AND LASER PROJECTION DEVICE", No. 201810636208.0, filed on Jun. 19, 2018, titled "PACKAGE ASSEMBLY OF LASER, LIGHT SOURCE MODULE AND LASER PROJECTOR", and No. 201810628604.9, filed on Jun. 19, 2018, titled "LIGHT SOURCE MODULE AND LASER PROJECTOR", which are incorporated herein by reference in their entirety.

TECHNICAL FIELD

The present disclosure relates to a technical field of laser projectors, and in particular to laser projection devices.

BACKGROUND

A small size laser of new type such as a multi-chip laser diode (MCL laser for short) occupies a small space, which is advantageous to the development of miniaturization of laser light source modules and is a development trend of laser projectors.

Connections between individual components in an optical path in a laser light source module have a high requirement for sealing of the optical path. If the optical path is not sealed well, impurities such as water and dust in an external environment will easily enter the internal light path of the laser light source module from a connection gap, which will change the transmission path of the internal light path and reduce an intensity of light.

SUMMARY

Some embodiments of the present disclosure provide a laser projection device including a laser, a sidewall of which is provided with a annular groove; a installing bracket, on which a laser installing opening is provided, the laser being fitted in the laser installing opening; a sealing ring including an embedded portion located in the annular groove and a curved portion outside the annular groove, a first bevel chamfer being formed on an outer side of the curved portion away from the sidewall of the laser, and a second bevel chamfer being formed between a top surface and an inner wall of the laser installing opening; wherein, the sealing ring is located between the sidewall of the laser and the laser installing opening, and the first bevel chamfer and the second bevel chamfer fit together.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

FIG. 3($b$) is a partially enlarged view of a laser installing opening of a installing bracket according to some embodiments of the present disclosure;

FIG. 3($c$) is a partially enlarged view of FIG. 3($b$);

FIG. 3 ($d$) is an enlarged view of part A in FIG. 2;

DETAILED DESCRIPTION

Figure 1:
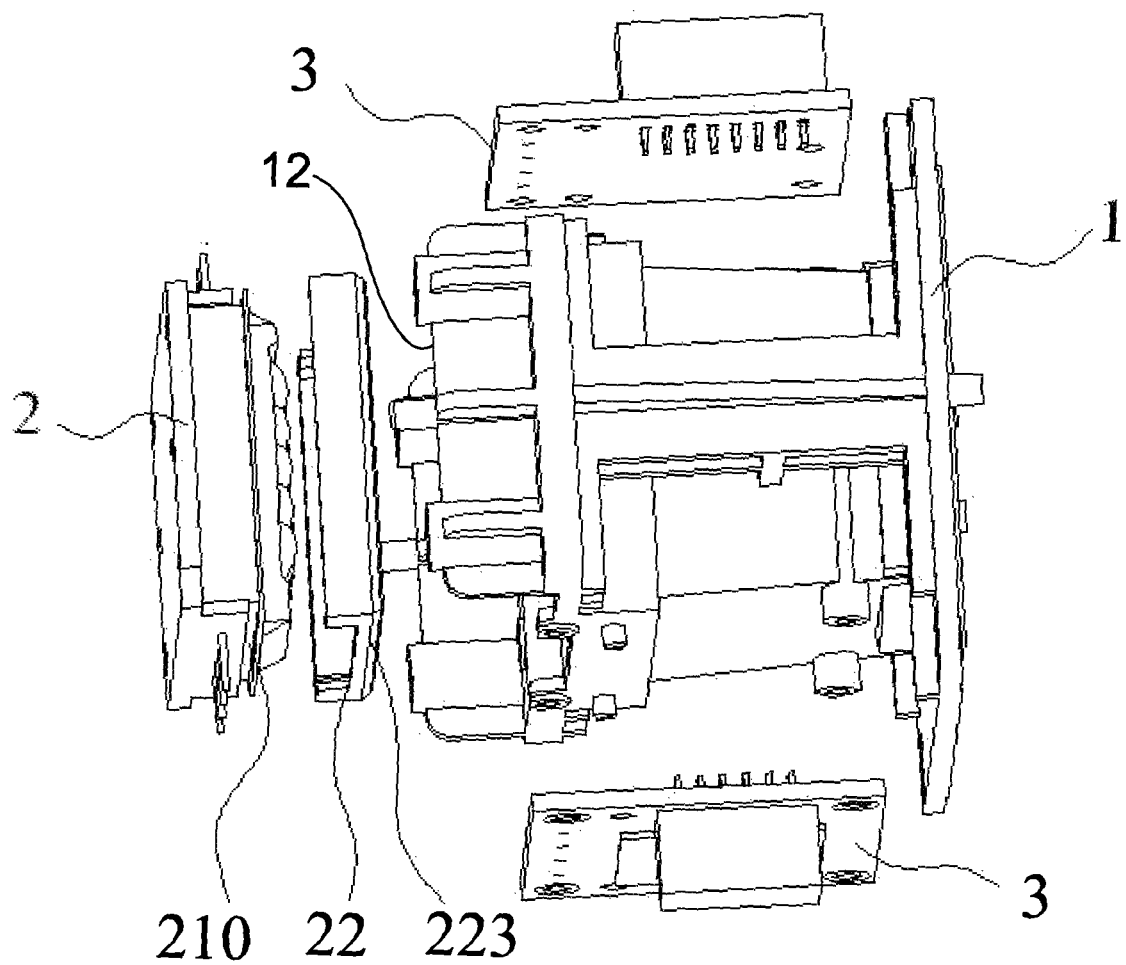
FIG. 1 is a schematic exploded structural view of a package assembly of a laser according to some embodiments of the present disclosure.

The technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

The embodiments of the disclosure will be described below in detail with reference to the accompanying drawings. It should be understood that embodiments described herein are only for illustration and explanation of the disclosure, but not for limitation to the disclosure.

In the description of the present disclosure, it should be understood that the orientations or positional relationships indicated by the terms such as "center", "upper", "lower", "front", "back", "left", "right", "vertical", "horizontal", "top," "bottom", "inner" and "outer" are based on the orientation or positional relationship shown in the drawings and are merely for ease of description of the present disclosure and simplified description, and are not indicative or implied that the devices or elements referred to must have a particular orientation, be constructed and operated in a particular orientation, and therefore should not be construed to limit the present disclosure.

In the description of the present disclosure, it should be noted that the terms "install", "connected", and "connect" should be understood in a broad sense unless specifically defined or defined otherwise, and may be, for example, a fixed connection or a detachable connection, or connecting integrally; Those of ordinary skill in the art can understand the specific meanings of the above terms in the present disclosure according to specific circumstances.

The terms "first" and "second" are used for descriptive purposes only and are not to be construed as indicating or implying relative importance or implicitly indicating the number of indicated technical features. Thus, features defined by "first" or "second" may explicitly or implicitly include one or more of the features. In the description of the present disclosure, unless otherwise specified, "a plurality of" means two or more than two.

Figure 4:
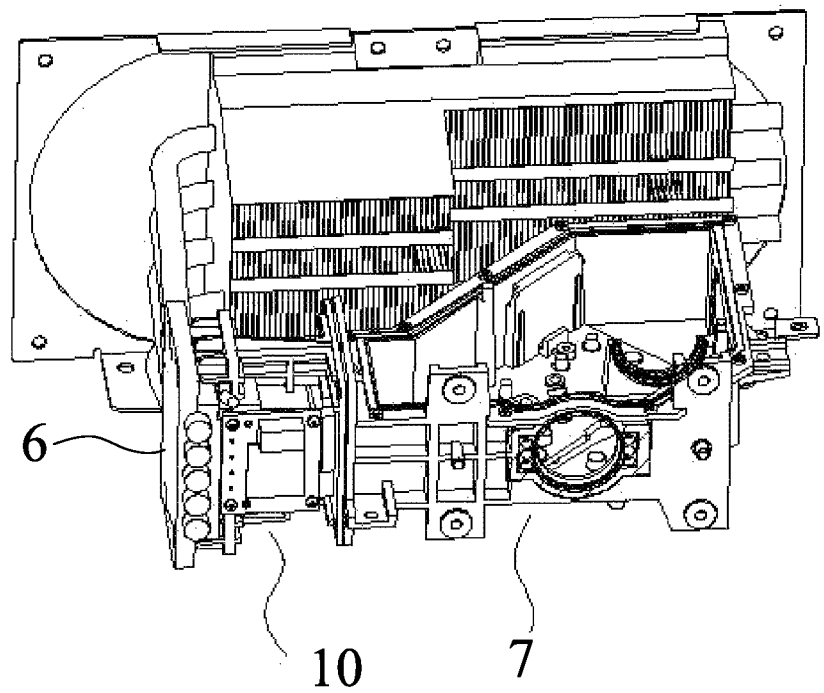
FIG. 4 is a schematic structural view of a laser projection device according to some embodiments of the present disclosure.

Some embodiments of the present disclosure provide a laser projection device. The laser projection device includes a light source module. As shown in FIG. 4, the light source module includes a main housing 7 and a package assembly 10. The package assembly 10 is located at a light inlet of the main housing 7.

Figure 2:
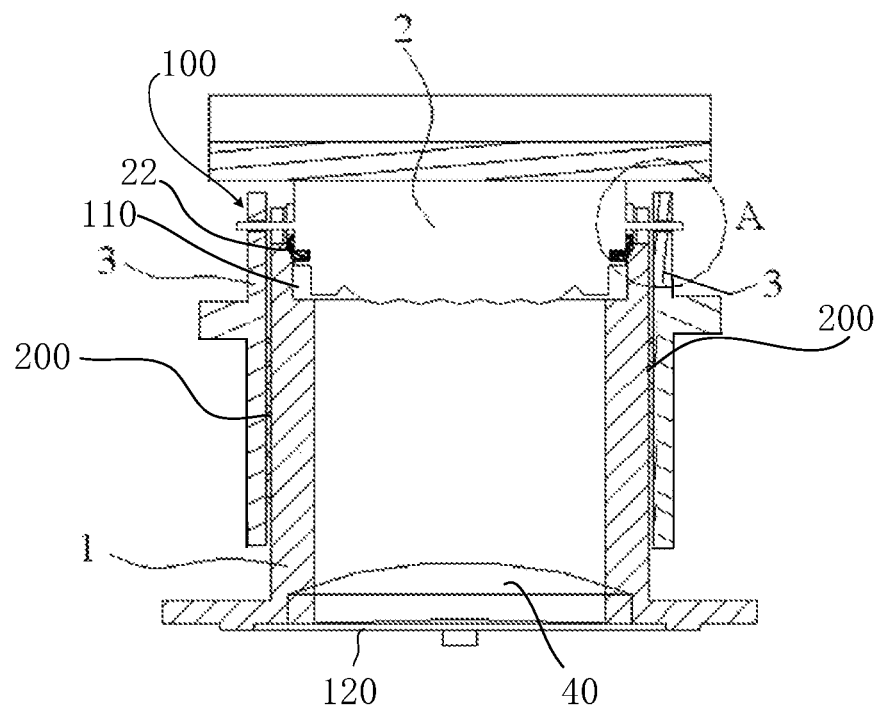
FIG. 2 is a schematic cross-sectional view of a package assembly of a laser according to some embodiments of the present disclosure.
Figure 3:
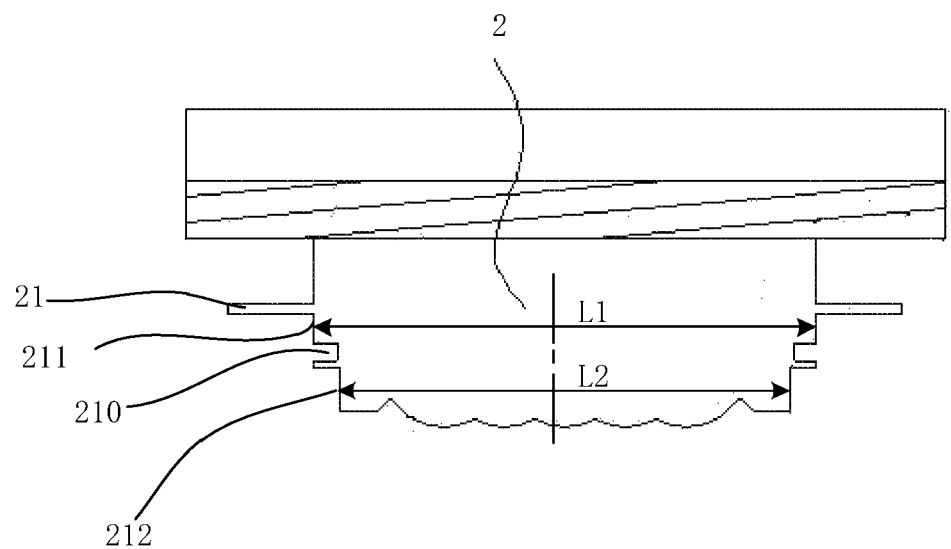
FIG. 3($a$) is a schematic structural view of a laser according to some embodiments of the present disclosure.
Figure 3:
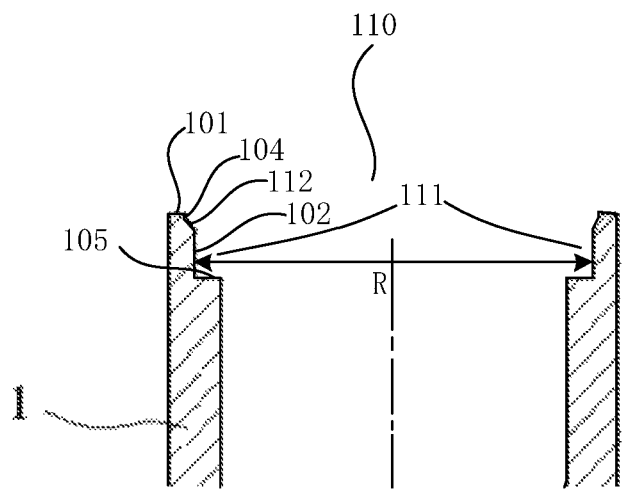
Figure 3:
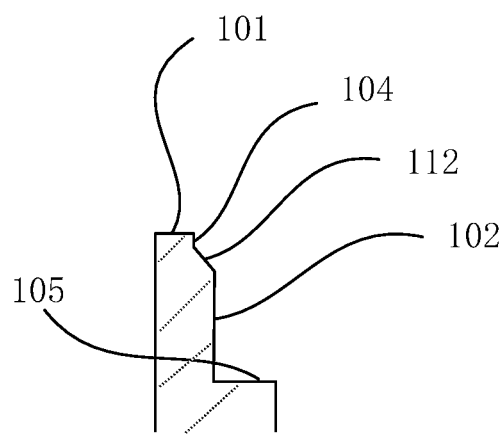
Figure 3:
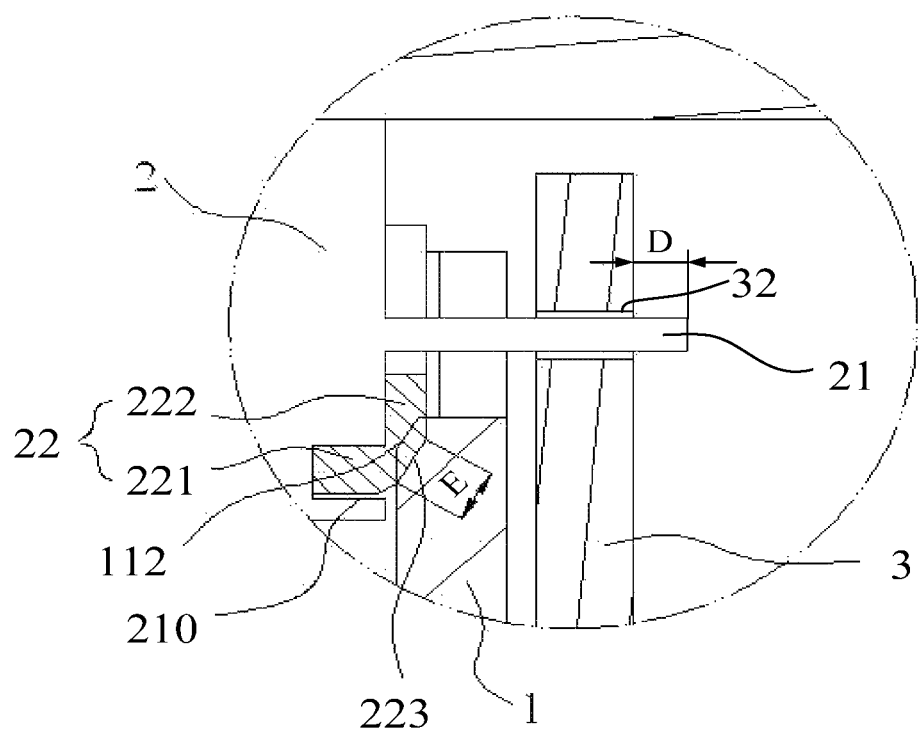

Referring to FIGS. 1 to 3(d), the package assembly 10 includes an installing bracket 1 and a laser 2. The laser 2 may be an MCL laser, or a laser composed of a single laser chip, or a laser of other type. In the drawing, the laser 2 uses the MCL laser as an example. The installing bracket 1 is provided with a laser installing opening 110, and the laser 2 is fitted in the laser installing opening 110. A sealing ring 22 is provided between a sidewall of the laser 2 and the laser installing opening 110. At least one side of the sidewall of the laser 2 is provided with a groove for accommodating the sealing ring. As shown in FIG. 3(a), in one embodiment, an annular groove 210 is provided in the sidewall of the laser 2. As shown in FIG. 3(d), the sealing ring 22 includes an embedded portion 221 in the annular groove 210 and a curved portion 222 outside the annular groove 210. A second bevel chamfer 112 is formed between a top surface and an inner wall of the laser installing opening 110, and a first bevel chamfer 223 is formed at a position of the curved portion 222 close to the second bevel chamfer 112 between the top surface and the inner wall of the laser installing opening 110, that is, the first bevel chamfer 223 is provided at an convex portion where the embedded portion 221 and the curved portion 222 are connected to each other. The first bevel chamfer 223 and the second bevel chamfer 112 fit together after the sealing ring 22 is installed. An overlapped portion between the first bevel chamfer 223 and the second bevel chamfer 112 in FIG. 3(d) is intended to indicate that there is a redundancy in dimension design for the matching of the first bevel chamfer 223 and the first bevel chamfer 112, so that a good seal may be formed after an installation of the sealing ring 22 is completed. The top surface of the laser installing opening 110 refers to the surface of the laser installing opening in a first surface 100. And the first surface 100 will described later in the text.

In a laser projection device provided by some embodiments of the present disclosure, the sealing ring 22 includes the embedded portion 221 located in the annular groove 210 in the sidewall of the laser 2 and the curved portion 222 outside the annular groove 210; the first bevel chamfer 223 is formed on an outer side of the joint between the curved portion 222 and the embedded portion 221, and the second bevel chamfer 112 is formed at an edge of the laser installing opening 110; the sealing ring 22 is located between the sidewall of the laser 2 and the laser installing opening 110, an inside of the curved portion 222 fits the sidewall of the laser 2, and the first bevel chamfer 223 fits the second bevel chamfer 112. In this way, a structure of the annular groove 210 of the laser 2 is fully utilized, and contact surfaces of the sealing ring 22 and the installing bracket 1 matched thereto are arranged obliquely, that is, an unconventional sealing means of an oblique contact surface is adopted, thus increasing an effective length of dust sealing, while leaving enough room for assembling of the laser. A problem of insufficient space for sealing is solved, and a strict dustproof test requirements of the light source module is satisfied, and the application effect and the service life of the laser or the light source module are improved.

As shown in FIG. 3(a), in some embodiments of the present disclosure, on the body of the laser, the annular groove 210 is located on a side of a pin 21 of the laser close to a light emitting surface of the laser 2, i.e., below the pin 21 of the laser in FIG. 3(a). A first step 211 is provided between the pin 21 and the annular groove 210 on the sidewall of the laser 2. When the laser 2 is installed on the installing bracket 1, the sealing ring 22 is firstly put on the sidewall of the laser 2, and the embedded portion 221 of the sealing ring 22 is installed in the annular groove 210; then, the laser 2 with the sealing ring 22 is set into the laser installing opening 110 of the installing bracket 1, and the curved portion 222 of the sealing ring 22 is in interference fit with the first step 211.

As shown in FIG. 3(a), in some embodiments of the present disclosure, on the sidewall of the laser 2 and on a side of the annular groove 210 close to the light emitting surface of the laser 2, i.e., below the annular groove 210 in FIG. 3(a), a second step 212 is provided. A corresponding diameter L2 at the second step 212 of the laser 2 is smaller than a corresponding diameter L1 at the first step 211. The diameter L1 at the first step 211 of the laser 2 is smaller than an inner diameter R of the laser install opening 110. The second step 212 may be align with a bottom portion of the annular groove 210, or closer to a center axis (shown by dot dash line in FIG. 3(a)) of the light emitting entrance of the laser 2 than the bottom of the annular groove 210.

As shown in FIG. 3(b), in some embodiments of the present disclosure, the laser installing opening 110 includes a recess 111 for receiving and fixing the laser 2. As shown in FIGS. 3(b) and 3(c), the recess 111 includes the top surface 101, the bottom portion 105, the inner wall (second sidewall 102) and the second bevel chamfer 112 between the top surface 101 and the inner wall (i.e., second sidewall 102).

In some embodiments, as shown in FIGS. 2, 3(a) and 3(b), the first surface 100 on the installing bracket 1 is recessed to form a receiving cavity for installing a laser, and a structure formed by a sidewall of the receiving cavity is called the laser installing opening 110. In some embodiments, the laser 2 includes a substrate and a laser main body located on the substrate, the annular groove 210 is located on the laser main body, and the substrate of the laser 2 is stuck outside the laser installing opening 110 so that the laser main body penetrates into the laser installing opening 110, and the substrate of the laser 2 may be fixedly connected with the installing bracket 1 through screws.

In some embodiments, a side of the installing bracket 1 facing the side of the substrate on which the laser body is provided is the first surface 100 provided with the laser installing opening 110. A first sidewall 104 on the inner side of the laser installing opening 110 and directly connected to the first surface 100 is perpendicular to the first surface 100 (i.e., parallel to a center axis of the laser installing opening 110, this center axis is shown by dot dash line in FIG. 3(b)).

Adjacent to another end of the first sidewall 104, a second sidewall 102 with a different height from the first sidewall 104 is provided. The distance between the second sidewall 102 and the central axis of the laser installing opening 110 is smaller than the distance between the first sidewall 104 and the central axis of the laser installing opening 110. The first sidewall 104 and the second sidewall 102 are connected by the second bevel chamfer 112. After the laser 2 is sealed, the inner side of the curved portion 222 of the sealing ring 22 is fitted to the sidewall of the laser 2, and the outer side of the curved portion 222 is fitted to the first sidewall 104 of the laser installing opening 110. The first bevel chamfer 223 and the second bevel chamfer 112 fit together.

In some embodiments of the present disclosure, along a depth direction of the recess 111, a cross-sectional area of the recess 111 gradually decreases, that is, an inner diameter of the laser installing opening 110 decreases in a direction that the laser is installed, and the laser installing opening 110 forms a structure of widened opening. In this way, it is convenient for the sealing ring 22 to reach into the recess 111 along with the laser 2.

In some embodiments of the present disclosure, a first sidewall 104 parallel to the inner wall (second sidewall 102) is further formed between the top surface 101 and the second bevel chamfer 112, and the first sidewall 104 interference fit with the curved portion 222 of the sealing ring 22.

In some embodiments of the present disclosure, to lengthen the effective length of a sealing surface, as shown in FIG. 3 (*d*), the width E of the first bevel chamfer 223 and the second bevel chamfer 112 is set to be greater than or equal to 1 mm, or greater than or equal to about 1 mm. In this way, sealing effect may be improved.

Figure 8:
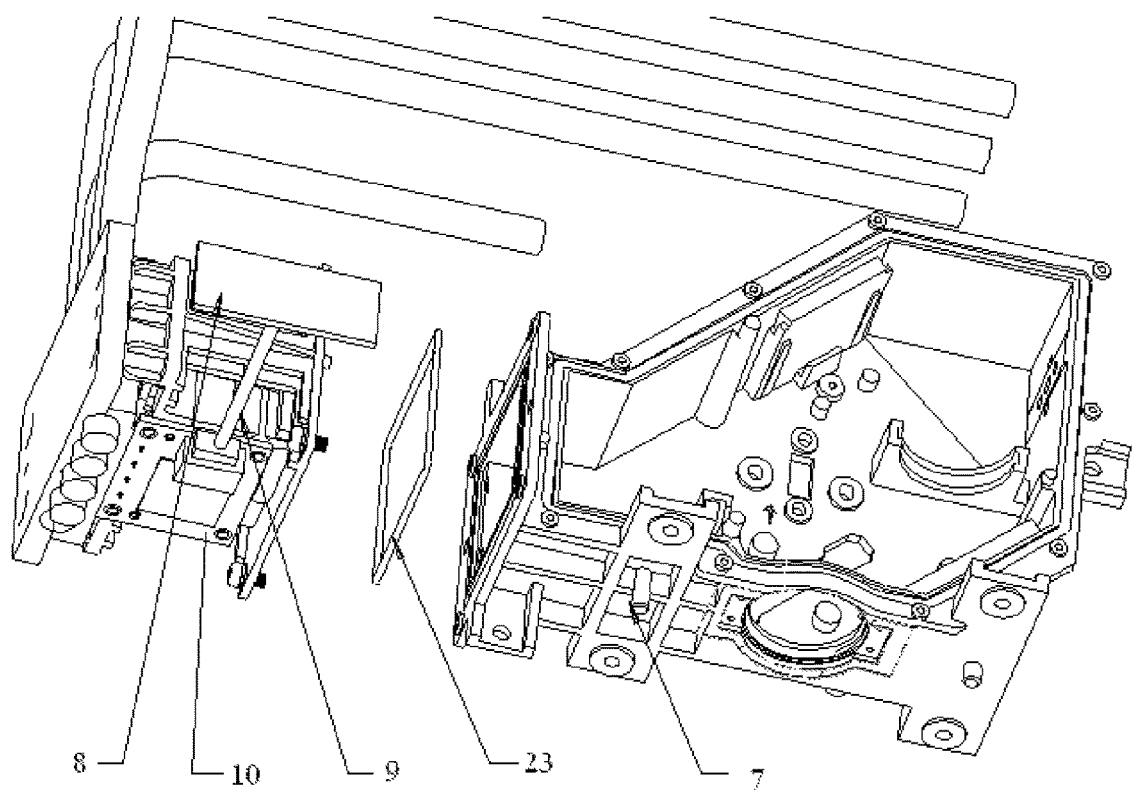
FIG. 8 is a schematic exploded structural view of a laser projection device according to some embodiments of the present disclosure.

In some embodiments of the present disclosure, as shown in FIG. 8, airtightness is achieved between the installing bracket 1 and a main housing 7 through the sealing ring 23 in a form of interference. The material of the sealing ring 23 may be fluororubber or other material. For example, the material of the sealing ring 23 is fluorinerubber. Fluorinerubber sealing ring has an advantage of being effective at sealing against dust, but also an advantage of being non-volatile organics at high temperatures.

In some embodiments of the present disclosure, the sealing ring has a Shore hardness of 50-65, for example, 55. Thus, the sealing ring may have a certain amount of elastic deformation to meet a requirement of the interference fit. The sealing ring here may be the sealing ring 22 or the sealing ring 23.

In some embodiments of the present disclosure, the sealing ring has a Shore hardness of about 50 to about 65, such as about 55.

Figure 9:
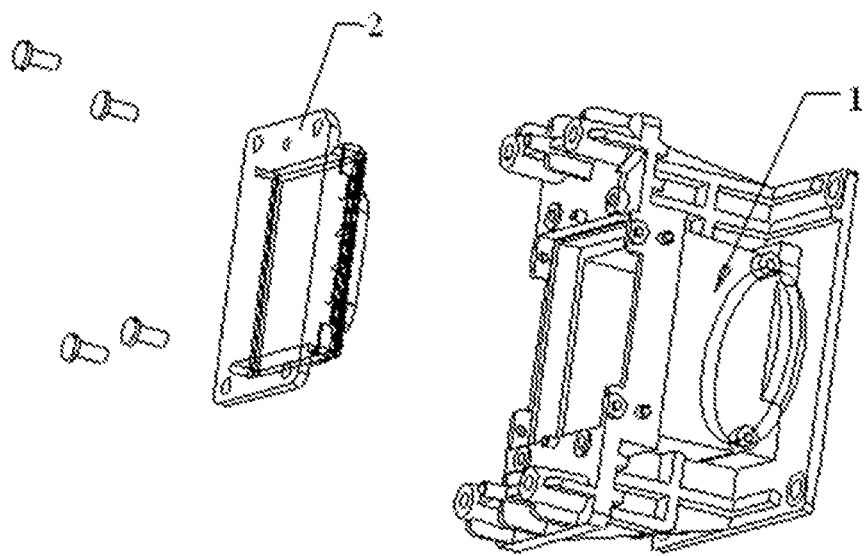
FIG. 9 is an assembled view of a laser and a installing bracket according to some embodiments of the present disclosure.
Figure 10:
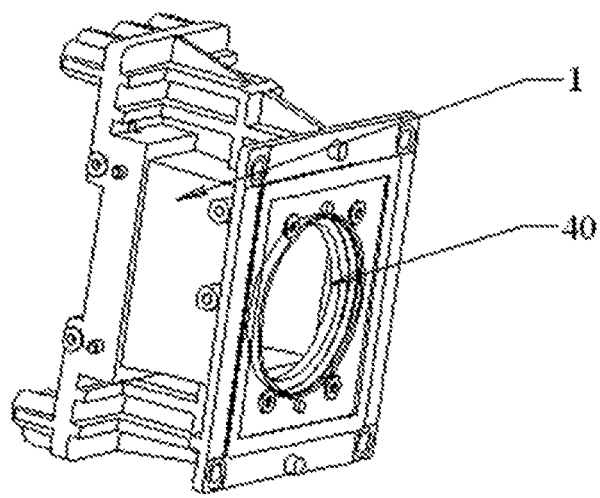
FIG. 10 is an assembly view of an installing bracket and a lens according to some embodiments of the present disclosure.

In some embodiments of the present disclosure, as shown in FIG. 9, the laser 2 and the installing bracket 1 are connected by threads or snaps In some embodiments of the present disclosure, in order to facilitate installation, as shown in FIG. 1, a guide groove 12 is provided on the installing bracket 1, and the guide groove 12 extends in a direction of the laser being loaded.

Exemplarily, the installation process of the laser 2 and the installing bracket 1 is as follows: firstly, through the elasticity of the sealing ring 22, the sealing ring 22 is substantially inserted into the annular groove 210 of the laser 2, and a protruding periphery of the sealing ring 22 is press-fitted into the annular groove 210 of the laser 2 with an insulating tweezers, to ensure that the embedded portion 221 embedded and flat. Then, the laser 2 is slid into the laser installing opening 110 through the guide groove 12 of the installing bracket 1 and passes through a positioning pillar to realize positioning of the laser 2 on the installing bracket 1. As shown in FIG. 3(*d*), the first bevel chamfer 223 and the second bevel chamfer 112 fit together. Finally, as shown in FIG. 9, the laser is fixed on the bracket by screws or snaps. In a process of locking with screws, diagonal locking is used, i.e., at least two screws structure are arranged along a diagonal of the laser to ensure the force between the first bevel chamfer 223 and the second bevel chamfer 112 uniform, so as to avoid seal failure caused by an occurrence of warpage between the two due to non-uniform force. In a process of screwing, the first bevel chamfer 223 is gradually interference fitted with the second bevel chamfer 112, thereby ensuring a tight seal.

In some embodiments of the present disclosure, an interference value between the first bevel chamfer 223 and the second bevel chamfer 112 is designed to be 0.2-0.5 mm, such as 0.3 mm. In other embodiments of the present disclosure, the interference of the first bevel chamfer 223 and the second bevel chamfer 112 is designed to be about 0.2 to about 0.5 millimeters, such as about 0.3 millimeters. In this way, it may ensure that the laser is sealed tightly without the laser being subjected to too much squeezing force.

Since the size of the laser 2 is small, the size of the corresponding optical path architecture is also small, a diameter of the lens adjacent to the laser 2 is also relatively small, and thus the distance between the lens 40 and the laser 2 is also small. In other embodiments of the present disclosure, the lens 40 is also fixed on the installing bracket 1. Exemplarily, as shown in FIG. 2, a lens installing opening 120 is provided on the installing bracket 1, and the lens installing opening 120 is opposite to the light emitting surface of the laser 2. Then, the lens 40 is fixed in the lens installing opening 120 by sealant, to ensure airtightness of the laser light source and reduce light attenuation.

Figure 5:
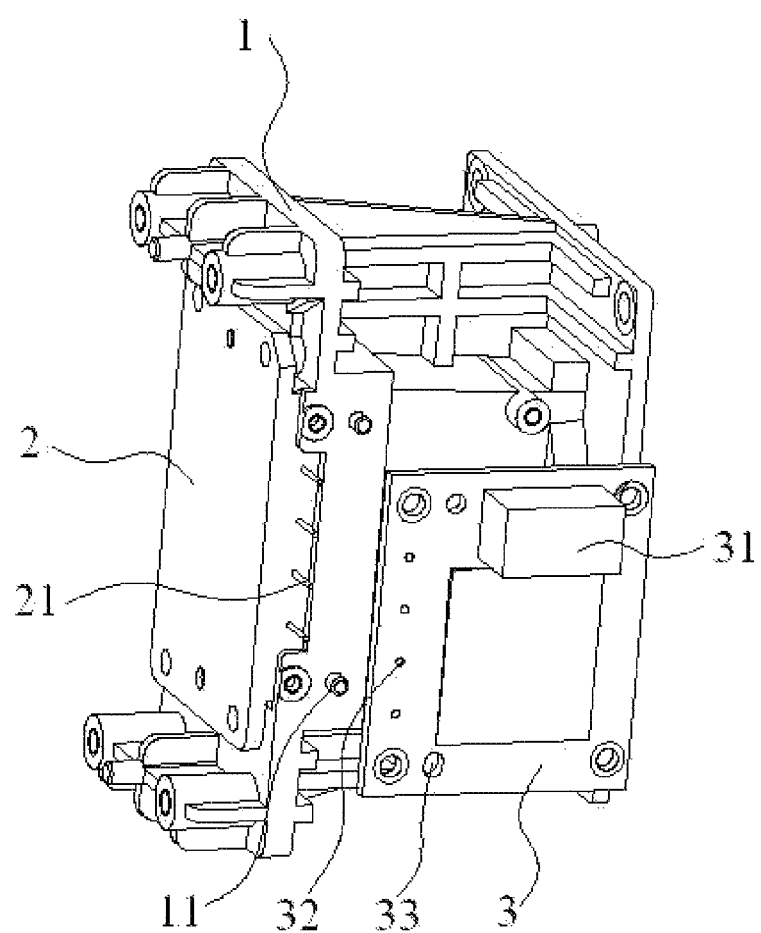
FIG. 5 is a schematic structural view of a package assembly of a laser according to some embodiments of the present disclosure.

In some embodiments of the present disclosure, referring to FIG. 2, FIG. 3(*d*) and FIG. 5, the laser projection device further includes: at least one transit circuit board 3, and the at least one transit circuit board 3 is configured to electrically connect with the pin 21 of the laser 2, and provided with a first socket 31. The first socket 31 is used for connecting with an optical engine driving board. As shown in FIG. 2, the installing bracket includes: a first surface 100 on which the laser installing opening 110 for installing the laser 2 is provided; and at least one second surface 200 adjacent to the first surface 100 and configured to install the at least one transit circuit board 3.

Figure 7:
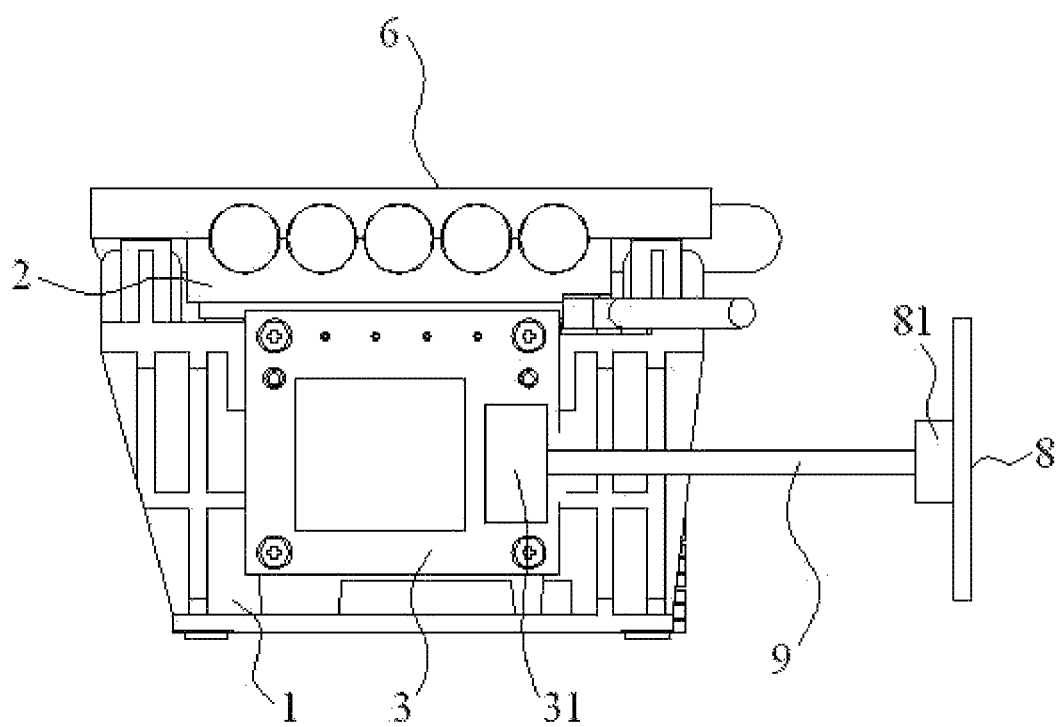
FIG. 7 is a schematic partial structural view of a laser projection device according to some embodiments of the present disclosure.

In the above embodiments of the present disclosure, the first socket 31 on the transit circuit board 3 may be connected to the optical engine driving board 8 such as a second socket 81 thereon via a flex cable 9 with a plug at both ends, so as to realize an electrical connection between the laser 2 and the optical engine driving board 8, as shown in FIGS. 7 and 8. The connection is easy to operate and only needs to insert the first socket 31 and the second socket 81 respectively with the plugs on the flex cable 9. It is beneficial to mass production and with reliability of the connection is high.

In some embodiments of the present disclosure, referring to FIG. 2, FIG. 3(*d*) and FIG. 5, each of the at least one transit circuit board 3 is provided with a conductive via 32, and the pin 21 of the laser is electrically connected to the conductive via 32. In this way, the pin 21 of the laser is not easy to get out of the conductive via 32, so that the electrical connection structure is firm and may resist mechanical experiments and transportation experiments without falling off.

In some embodiments of the present disclosure, as shown in FIG. 2 and FIG. 3(d), copper is exposed at the conductive via 32, and the pin 21 of the laser is soldered with the exposed copper of the via.

In some embodiments of the present disclosure, as shown in FIG. 2 and FIG. 3(d), a length D of the pin of the laser protruding from the conductive via 32 is greater than or equal to 1 mm, or a length D of the pin of the laser protruding from the conductive via 32 is greater than or equal to about 1 mm.

In some embodiments of the present disclosure, as shown in FIG. 5, the installing bracket 1 is provided with a positioning pillar 11, and each of the at least one transit circuit board 3 is provided with a positioning hole 33. The positioning pillar 11 extends in a direction of each the at least one transit circuit board 3 being loaded, and the positioning pillar 11 fit into the positioning hole 33 when installed.

In some embodiments of the present disclosure, as shown in FIG. 2, two transit circuit boards 3 are provided, and located on two opposite surfaces of the installing bracket 1, respectively. Pins 21 are provided on two opposite sides of the laser 2, and are electrically connected with the two transit circuit boards 3, respectively.

Figure 6:
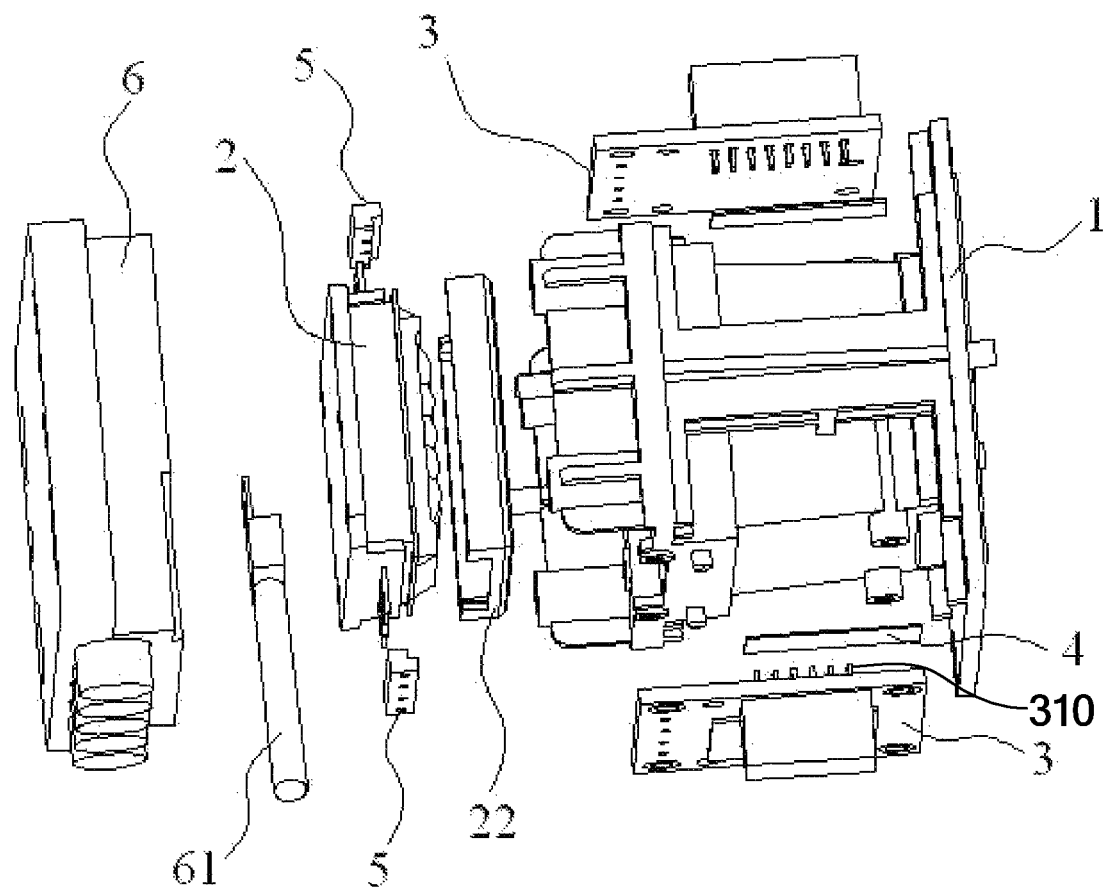
FIG. 6 is a schematic exploded structural view of a package assembly of a laser according to some embodiments of the present disclosure.

In some embodiments of the present disclosure, as shown in FIG. 6, an insulating spacer 4 is provided between the installing brackets 1 and the transit circuit board 3, and the insulating spacer 4 is located at the corresponding area of a contact pin 310 of the first socket 31. In this way, the contact pin 310 of the first socket 31 may be prevented from communicating with other metals to cause a short circuit.

Similarly, as shown in FIG. 6, in some embodiments of the present disclosure, in order to avoid a short circuit of the pin 21 of the laser, an insulating soft pad 5 is sheathed on the pin 21 of the laser, and the insulating soft pad 5 is located between the installing bracket 1 and the transit circuit board 3. In this way, the pin 21 of the laser may be prevented from connecting with other metals to cause a short circuit.

In some embodiments of the present disclosure, as shown in FIG. 6, the first surface of the installing bracket 1 is connected with a heat sink 6, and the laser 2 is located between the installing bracket 1 and the heat sink 6. In this way, heat of the laser 2 may be quickly dissipated through the heat sink 6.

In some embodiments of the present disclosure, as shown in FIG. 6, the laser 2 is connected with a temperature detector 61 to detect temperature condition of the laser 2 in real-time.

In some embodiments of the present disclosure, as shown in FIG. 7 and FIG. 8, the laser projection device further includes an optical engine driving board and a flex cable 9 8 with a plug at both ends, and the plug at one end of the flex cable 9 is plugged into the first socket 31 of the laser projection device, the plug at the other end of the flex cable 9 is plugged into a second socket 81 of the optical engine driving board 8. In this way, the assembly and maintenance of the laser projection device are facilitated.

In addition, some embodiments of the present disclosure also provide another laser projection device including a light source module. As shown in FIGS. 7 and 8, the light source module includes a laser package assembly, a flex cable 9 with a plug at both two ends, an optical engine driving board 8, and a main housing 7.

In the laser projection device, as shown in FIG. 2 to FIG. 5, the laser package assembly includes a laser 2, an installing bracket 1, and a transit circuit board 3. The laser 2 is installed on a first surface 100 of the installing bracket 1. The transit circuit board 3 is installed on a second surface 200 of the installing bracket 1 adjacent to the first surface 100, and the transit circuit board 3 is electrically connected with a pin 21 of the laser. The transit circuit board 3 is also provided with a first socket 31.

As shown in FIGS. 7 and 8, the laser package assembly above is located at a light inlet of the main housing 7. The optical engine driving board 8 is provided with a second socket 81. One end of the flex cable 9 with a plug at both ends is plugged into the first socket 31 of the transit circuit board 3 in the package assembly, and the other end of the flex cable 9 is plugged into the second socket 81 on the optical engine driving board 8.

In the laser projection device provided by the embodiment of the present disclosure, the transit circuit board 3 is located on the installing bracket 1, and the pin 21 of the laser is electrically connected with the transit circuit board 3, so that the first socket 31 on the transit circuit board 3 may be connected with the optical engine driving board 8, for example the second socket 81 on the optical engine driving board 8, through flex cable 9 with a plug at both ends, so as to realize electrical connection between the laser 2 and the optical engine driving board 8 (as shown in FIG. 7). The connection is easy to operate and only requires the first socket 31 and the second socket 81 to insert respectively with the plugs on the flex cable 9. It is beneficial to mass production and reliability of the connection is high.

In some embodiments of the present disclosure, in order to ensure the fixed reliability between the transit circuit board 3 and the pin of the laser, and avoid twisting interference between the transit circuit board 3 and the pin of the laser caused by a torsional force acting on the transit circuit board 3 during the screws are pressed, as shown in FIG. 5, the installing bracket 1 is provided with a positioning pillar 11 extending in a direction of the transit circuit board 3 being loaded, and the transit circuit board 3 is provided with a positioning hole 33 in which the positioning pillar 11 fits when installed. In this way, during installation, the laser 2 is firstly fixed to the installing bracket 1, and the circuit boards on both sides of the laser (or, the circuit board on one side of the lase) are passed onto the pins of the laser 2, meanwhile the positioning hole 33 on the transit circuit board 3 passes through the positioning pillar 11 on the installing bracket 1, and then screws is fitted to fix the circuit board on the bracket. In some embodiments of the present disclosure, a gap between the positioning pillar 11 and the positioning hole 33 is smaller than a gap between the conductive via 32 of the transit circuit board 3 and the pin of the laser 2. In this way, when the transit circuit board 3 occurs twisting, only the positioning hole 33 of the bracket is in contact with the transit circuit board 3, and the pins of the laser 2 does not come into contact with the transit circuit board 3, so as to avoid a damage to the pins of the laser 2 during the assembly process of the transit circuit board 3.

In general, the laser 2 is provided with pins on two opposite sides thereof. To facilitate connection with the pins on both sides, in some embodiments of the present disclosure, as shown in FIGS. 2 and 7, two transit circuit boards 3 are provided on two second surfaces 200 located oppositely on the installing brackets 1 respectively, and the pins on both sides of the laser 2 are respectively electrically connected with a corresponding transit circuit board 3. Each of the two transit circuit boards 3 has a first socket 31. Two first sockets 31 of the two transit circuit boards 3 may be electrically connected to the optical engine driving board 8 through the flex cable 9. This structure reasonably allocates the installation space and realizes a compact design.

Laser 2 has higher heat during operation. In some embodiments of the present disclosure, as shown in FIGS. 4 and 8, a heat sink 6 is provided on the first surface 100 of the installing bracket 1, and the laser 2 is located between the installing bracket 1 and the heat sink 6. In this way, heat of the laser 2 may be quickly dissipated through the heat sink 6.

In some embodiments of the present disclosure, as shown in FIG. 8, a temperature detector 61 is connected to the laser 2 to detect the temperature condition of the laser 2 in real-time.

In some embodiments of the present disclosure, a sealing ring 22 is further provided between the installing bracket 1 and the laser 2.

An exemplary assembly process of the light source module is as follows. Firstly, a sealing ring 22, such as a sealed fluororubber ring, is inserted into the groove of the laser 2, and then the laser 2 is placed on the installing bracket 1, a pressure is applied to the laser 2, and the laser 2 is fixed on the installing bracket 1 with screws. Secondly, the insulating spacer 4 is placed into a profiling groove of the installing bracket 1, and the insulating soft pad 5 on the pin 21 of the laser. Then, the conductive via 32 of the transit circuit board 3 passes through the pin 21 of the laser, and meanwhile the positioning hole 33 of the transit circuit board 3 passes through passes through the two positioning pillars 11 of the bracket, and then screws is fitted to fix the circuit board on the bracket. Thirdly, the transit circuit board 3 is soldered with the pin 21 of the laser to realize the electrical connection between the two; and the temperature detector 61 is assembled to a metal plate of the laser 2; and then thermal grease is applied on the metal plate of the laser 2, and the heat sink 6 is screw on the bracket and contact with a surface of the metal plate of the laser 2 coated with the thermal grease. Finally, a package assembly of the laser 2 is integrally fixed to the main housing 7 of the light source module, and a sealing between the installing bracket 1 and the main housing 7 is achieved through the interference squeeze of the sealing ring 23. The flex cable 9 is inserted into the first socket 31 of the transit circuit board 3 to connect to the second socket 81 of the optical engine driving board 8, and finally, the communication between the laser 2 and other functional circuit boards such as the optical engine driving board 8 is realized.

In some embodiments of the present disclosure, the installing bracket 1 also serves to fix the heat sink 6, the temperature detector 61, the laser 2, the transit circuit board 3, and the lens 40 and the like. As shown in FIGS. 2, 4, and 6, on one surface (first surface 100) of the installing bracket 1 the heat sink 6 and the laser 2 are placed, and another surface opposite to the surface (lower surface in FIG. 2) is provided with the lens 40 and connect with the main housing 7. Two sides of the installing bracket 1 are hollowed to place two transit circuit boards 3. Meanwhile, this solution also achieves the following functions of: the sealing of the laser 2 achieved through the sealing ring 22, and the connection between the laser 2 and the transit circuit board 3 achieved through the electrically connection pin 21 of the laser 2 and the conductive via 32, the sealing of the lens 40 achieved through the sealant, and the hermetic sealing between the installing bracket 1 and the main housing 7 achieved through the sealing ring 23. In this solution, one piece is used in many ways, space is utilized to the greatest degree, and miniaturization design of a local area of the light source is realized.

In the laser projection device provided in the embodiment of the present disclosure, the installing bracket is provided in the light source module to fix the laser, and the transit circuit board is arranged on the installing bracket so that the pins of the laser are electrically connected to the transit circuit board. Then, the first socket on the transit circuit board and the second socket on the optical engine driving board are connected through the flex cable to realize an electrical connection between the laser and the optical engine driving board. The connection is easy to operate, and only requires the sockets are plugged in the plugs of the flex cable. It is beneficial to mass production and reliability of the connection is high.

It should be understood that though the MCL laser is taken as an example for illustration in this description, the application of the present disclosure is not limited thereto, and the technical solution of the present disclosure may also be applied to other lasers.

In the descriptions of the implementations, specific features, structures, materials or characteristics can be combined appropriately in any one or more embodiments or examples.

Additional embodiments including any one of the embodiments described above may be provided by the disclosure, where one or more of its components, functionalities or structures is interchanged with, replaced by or augmented by one or more of the components, functionalities or structures of a different embodiment described above.

The foregoing descriptions merely show specific implementations of the present disclosure, and the protection scope of the present disclosure is not limited thereto. Any person of skill in the art can readily conceive of variations or replacements within the technical scope disclosed by the embodiments of the present disclosure, and these variations or replacements shall fall into the protection scope of the present disclosure. Accordingly, the protection scope of the present disclosure shall be subject to the protection scope of the claims.

What is claimed is:

1. A laser projection device comprising:
   a laser, wherein a sidewall of the laser includes an annular groove;
   an installing bracket, wherein a laser installing opening is located on the installing bracket, and wherein the laser is at least partially received by the laser installing opening; and
   a sealing ring including an embedded portion located in the annular groove and a curved portion outside the annular groove, wherein a first bevel chamfer is formed on an outer side of the curved portion facing away from the sidewall of the laser, and wherein a second bevel chamfer is formed between a top surface and an inner wall of the laser installing opening,
   wherein the sealing ring is located at least partially between the sidewall of the laser and the laser installing opening, and wherein the first bevel chamfer and the second bevel chamfer have complementary shapes that substantially fit together.

2. The laser projection device according to claim 1, wherein the first bevel chamfer and the second bevel chamfer fit together with an interference fit.

3. The laser projection device according to claim 1, wherein an interference value between the first bevel chamfer and the second bevel chamfer is between about 0.2 mm and about 0.5 mm.

4. The laser projection device according to claim 1, wherein a width of the first bevel chamfer is at least about 1 mm.

5. The laser projection device according to claim 1, wherein the sealing ring is at least partially formed of fluororubber.

6. The laser projection device according to claim 5, wherein the sealing ring has a Shore hardness of between about 50 and about 65.

7. The laser projection device according to claim 1, wherein a guide groove is located on the installing bracket, and wherein the guide groove extends in a direction parallel to the direction that the laser is loaded.

8. The laser projection device according to claim 1, wherein the laser and the installing bracket are connected by at least one of threads and snaps.

9. The laser projection device according to claim 1, wherein a lens installing opening is included on the installing bracket, and wherein the lens installing opening is located on an opposite side of the installed bracket relative to a light emitting surface of the laser.

10. The laser projection device according to claim 1, wherein the laser is a MCL laser.

11. The laser projection device according to claim 1, further including:
at least one transit circuit board configured to be electrically connected to a respective pin of the laser,
wherein each transit circuit board includes a first socket configured for connecting with an optical engine driving board through a flex cable; and
wherein the installing bracket includes:
a first surface, wherein the laser is installed on the first surface; and
at least one second surface located adjacent to the first surface and configured to receive the at least one transit circuit board.

12. The laser projection device according to claim 11, wherein the transit circuit board(s) each include a conductive via, and wherein the respective pin of the laser is electrically connected to each conductive via.

13. The laser projection device according to claim 12, wherein a length of the pin(s) of the laser protruding from the conductive via is at least about 1 mm.

14. The laser projection device according to claim 11, wherein the installing bracket includes at least one positioning pillar and wherein each of the transit circuit board(s) includes a positioning hole configured to receive the respective positioning pillar(s).

15. The laser projection device according to claim 11, wherein the at least one transit circuit board includes two transit circuit boards, and wherein the two transit circuit boards are respectively located on opposite second surfaces of the installing bracket, and
wherein two pins are located respectively on opposite sides of the laser, and wherein the pin on one of the sides of the laser is electrically connected with one of the two transit circuit boards located on that same side of the laser.

16. The laser projection device according to claim 11, wherein an insulating spacer is located adjacent to the at least one transit circuit board and between a contact pin of the first socket and the installing bracket.

17. The laser projection device according to claim 11, wherein the laser is connected with a heat sink, and wherein the heat sink is located on a side of the laser facing away from the installing bracket.

18. The laser projection device according to claim 1, wherein a first step is included between the pin of the laser and the annular groove, and wherein the curved portion of the sealing ring is coupled to the first step with an interference fit.

19. The laser projector device according to claim 18, wherein a second step is included on a side of the annular groove adjacent to a light emitting surface of the laser.

20. The laser projection device according to claim 1, wherein a first sidewall parallel to the inner wall of the laser installing opening is formed between the top surface and the second bevel chamfer of the laser installing opening, and wherein the first sidewall is coupled to the curved portion of the sealing ring with an interference fit.

* * * * *

UNITED STATES PATENT AND TRADEMARK OFFICE
CERTIFICATE OF CORRECTION

PATENT NO. : 10,389,968 B1  
APPLICATION NO. : 16/029272  
DATED : August 20, 2019  
INVENTOR(S) : Xianglai Pang et al.

Page 1 of 1

It is certified that error appears in the above-identified patent and that said Letters Patent is hereby corrected as shown below:

On the Title Page

Insert item (72), as follows:  
-- Xianglai Pang, Qingdao, Shandong (CN)  
Changming Jia, Qingdao, Shandong (CN)  
Hangjie Fan, Qingdao, Shandong (CN)  
Fei Zhao, Qingdao, Shandong (CN)  
Zinan Zhou, Qingdao, Shandong (CN)  
Xiuyan Cao, Qingdao, Shandong (CN) --

Signed and Sealed this  
Twenty-sixth Day of May, 2020

Andrei Iancu  
*Director of the United States Patent and Trademark Office*